(12) United States Patent
Shin et al.

(10) Patent No.: US 10,663,013 B2
(45) Date of Patent: May 26, 2020

(54) POWER DELIVERY DEVICE FOR AUTOMATIC TRANSMISSION

(71) Applicants: Hyundai Motor Company, Seoul (KR); Kia Motors Corporation, Seoul (KR)

(72) Inventors: Yong Uk Shin, Suwon-si (KR); Juhyeon Park, Suwon-si (KR); Minho Chae, Incheon (KR); Seongwook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 71 days.

(21) Appl. No.: 16/128,661

(22) Filed: Sep. 12, 2018

(65) Prior Publication Data
US 2019/0178304 A1    Jun. 13, 2019

(30) Foreign Application Priority Data
Dec. 11, 2017   (KR) .......................... 10-2017-0169259

(51) Int. Cl.
F16D 25/0638    (2006.01)
F16H 57/08      (2006.01)
F16D 13/52      (2006.01)

(52) U.S. Cl.
CPC ......... F16D 25/0638 (2013.01); F16D 13/52 (2013.01); F16H 57/08 (2013.01); *F16D 2300/08* (2013.01); *F16H 2057/087* (2013.01)

(58) Field of Classification Search
None
See application file for complete search history.

(56) References Cited

U.S. PATENT DOCUMENTS

| | | | |
|---|---|---|---|
| 5,511,644 A * | 4/1996 | Murata | F16D 13/52 192/109 F |
| 5,950,787 A * | 9/1999 | Murasugi | F16D 25/06 192/85.25 |
| 9,255,634 B2 | 2/2016 | Sasaki et al. | |
| 2012/0247913 A1 * | 10/2012 | Nakano | F16D 23/06 192/18 A |
| 2015/0051800 A1 * | 2/2015 | Kamada | F16H 61/04 701/51 |
| 2018/0347639 A1 * | 12/2018 | Ishizaka | F16H 63/3026 |

FOREIGN PATENT DOCUMENTS

JP    2015-190526 A    11/2015

* cited by examiner

*Primary Examiner* — Timothy Hannon
(74) *Attorney, Agent, or Firm* — Morgan, Lewis & Bockius LLP

(57) ABSTRACT

A power delivery device for an automatic transmission may include a clutch drum connected to an input shaft, a clutch disposed in the clutch drum and including a friction member connected to a planet carrier of a planetary gear set through a clutch hub, and a piston device disposed corresponding to the clutch and operating the clutch by hydraulic pressure.

15 Claims, 3 Drawing Sheets

POWER DELIVERY DEVICE FOR AUTOMATIC TRANSMISSION

CROSS-REFERENCE TO RELATED APPLICATION

The present application claims priority to Korean Patent Application No. 10-2017-0169259 filed on Dec. 11, 2017, the entire contents of which is incorporated herein for all purposes by this reference.

BACKGROUND OF THE INVENTION

Field of the Invention

The present invention relates to a power delivery device for an automatic transmission. More particularly, the present invention relates to a power delivery device for an automatic transmission which controls a gap between friction members and provides coupling force optimized for each operating stage by use of dual pistons.

Description of Related Art

Environmentally-friendly technique of vehicles is very important technique on which survival of future motor industry is dependent. As regulations of exhaust gas become tightened, vehicle makers are focusing on development of environmentally-friendly vehicles to meet environment and fuel consumption regulations.

To enhance of fuel economy, researches on high efficiency engine, high efficiency transmission, vehicle body lightening, etc. is actively proceeding. Particularly, dual clutch transmissions, automated manual transmissions, etc. having advantages of both efficiency of manual transmissions and convenience of automatic transmissions are developed briskly in a transmission field.

According to such transmissions, power of an engine is transmitted to a rotation element through a clutch of dry or wet type. Particularly, since a clutch used in a dual clutch transmission and an automated manual transmission transmits engine torque directly transmitted from an engine to a rotation element, great coupling force and control precision are demanded.

That is, a clutch for such a dual clutch transmission and an automated manual transmission is required for quick operating speed of a piston for quick power delivery at a stage (i.e., an initial operating stage) where a piston moves to a clutch disk and a clutch plate that are friction members and is required for great coupling force for cutting off power rather than quick operating speed of the piston after the clutch disk and the clutch plate are coupled.

Recently, a clutch provides quick operating speed of a piston and great coupling force in this respect, but operating speed and coupling force are not precisely controlled for each operating stage. Accordingly, operating efficiency of a clutch may be deteriorated.

Furthermore, as great coupling force of the piston is repeatedly applied to the clutch plate with quick operating speed, the clutch may be damaged due to accumulated fatigue.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power delivery device configured for an automatic transmission having advantages of rapidly controlling a gap between friction members and securing quick responsiveness and great coupling force by applying dual pistons sequentially operated to operate a clutch.

A power delivery device configured for an automatic transmission according to an exemplary embodiment of the present invention may include a clutch drum connected to one rotation element and including an external circumferential portion and a protruding portion extending in an axial direction at a radial internal of the external circumferential portion, a clutch disposed in the clutch drum, connected to another rotation element through a clutch hub, and selectively connectable to the one rotation element, and a piston device disposed corresponding to the clutch and operating the clutch by hydraulic pressure.

The piston device may include: a first piston having an internal circumferential portion closely contacting the one rotation element and an external circumferential portion closely contacting the protruding portion of the clutch drum, and being movable toward the clutch in the axial direction by receiving hydraulic pressure through a first hydraulic line formed in the one rotation element; a second piston having an internal circumferential portion closely contacting the one rotation element and an external circumferential portion closely contacting the external circumferential portion of the first piston, and having a front end portion directly applying operating force to the clutch by receiving hydraulic pressure through a second hydraulic line formed in the one rotation element; a spring retainer mounted between the one rotation element and the second piston; and a return spring mounted between the spring retainer and the second piston and applying restoring force to the first piston and the second piston.

The piston device may further include a first stopper mounted on the one rotation element between the first piston and the second piston and limiting movements of the first piston and the second piston in the axial direction thereof.

The first stopper may be a snap ring fitted onto the one rotation element between the first and the second hydraulic lines to limit the movement of the first piston toward the clutch and the movement of the second piston to an opposite direction to the clutch.

Movement of the spring retainer toward the clutch may be limited by a second stopper mounted on the one rotation element, and the spring retainer may support the return spring in the axial direction thereof, have an external circumferential portion closely contacting the external circumferential portion of the second piston, and generate balance hydraulic pressure between the spring retainer and the second piston by receiving hydraulic pressure through a third hydraulic line formed in the one rotation element.

The second stopper may be a snap ring fitted onto the one rotation element.

The external circumferential portions of the first piston and the second piston may be disposed in parallel with each other in the axial direction thereof, wherein sealing members are located between the external circumferential portion of the first piston and the protruding portion of the clutch drum and between the external circumferential portion of the first piston and the external circumferential portion of the second piston.

The external circumferential portion of the second piston may contact with the external circumferential portion of the first piston at a radial external side of the first piston.

The external circumferential portion of the second piston and the protruding portion of the clutch drum may be disposed on the same axis.

The internal circumferential portions of the first piston and the second piston may be disposed in parallel with each other and slidable on the one rotation element, wherein sealing members are located between the internal circumferential portion of the first piston and the one rotation element and between the internal circumferential portion of the second piston and the one rotation element.

The one rotation element may be an input shaft operably connected to an output side of an engine. The another rotation element may be any one among three rotation elements of planetary gear set.

A power delivery device configured for an automatic transmission according to another exemplary embodiment of the present invention may include a clutch drum connected to an input shaft and including an external circumferential portion and a protruding portion extending in an axial direction at a radial internal of the external circumferential portion, a clutch disposed in the clutch drum and including a friction member connected to a planet carrier of a planetary gear set through a clutch hub, and a piston device disposed corresponding to the clutch and operating the clutch by hydraulic pressure.

The piston device may include: a first piston having an internal circumferential portion closely contacting the input shaft and an external circumferential portion closely contacting the protruding portion of the clutch drum, and being movable toward the clutch in the axial direction by receiving hydraulic pressure through a first hydraulic line formed in the input shaft; a second piston having an internal circumferential portion closely contacting the input shaft and an external circumferential portion closely contacting the external circumferential portion of the first piston, and having a front end portion directly applying operating force to the clutch by receiving hydraulic pressure through a second hydraulic line formed in the input shaft; a first stopper mounted on the input shaft between the first piston and the second piston and limiting movements of the first piston and the second piston in the axial direction thereof; a spring retainer mounted between the input shaft and the second piston, wherein movement of the spring element toward the clutch is limited by a second stopper mounted on the input shaft; and a return spring mounted between the spring retainer and the second piston and applying restoring force to the first piston and the second piston.

The first stopper may be a snap ring fitted onto the input shaft between the first and the second hydraulic lines to limit the movement of the first piston toward the clutch and the movement of the second piston to an opposite direction to the clutch.

The spring retainer may have an external circumferential portion closely contacting the external circumferential portion of the second piston and may be configured to generate balance hydraulic pressure between the spring retainer and the second piston by receiving hydraulic pressure through a third hydraulic line formed in the input shaft.

The second stopper may be a snap ring fitted onto the input shaft.

The external circumferential portions of the first piston and the second piston are disposed in parallel with each other in the axial direction thereof, wherein sealing members are located between the external circumferential portion of the first piston and the protruding portion of the clutch drum and between the external circumferential portion of the first piston and the external circumferential portion of the second piston.

The external circumferential portion of the second piston may contact with the external circumferential portion of the first piston at a radial external side of the first piston.

The external circumferential portion of the second piston and the protruding portion of the clutch drum may be disposed on the same axis.

The internal circumferential portions of the first piston and the second piston may be disposed in parallel with each other and slidable on the input shaft, wherein sealing members are located between the internal circumferential portion of the first piston and the input shaft and between the internal circumferential portion of the second piston and the input shaft.

According to an exemplary embodiment of the present invention, responsiveness may be improved by applying dual pistons for operating a clutch and rapidly controlling a gap between friction members with high speed, and power delivery efficiency may be increased by securing coupling force.

Since accumulated fatigue repeatedly applied to a clutch plate is minimized by rapidly controlling the gap between the friction members and achieving sufficient coupling force by use of the dual pistons, damage of the clutch may be prevented.

According to an exemplary embodiment of the present invention, drag loss when releasing the clutch is reduced by a return spring which is directly applied to the dual pistons and balance hydraulic pressure supplied between the dual pistons and a spring retainer. Furthermore, control reliability may be enhanced by countervailing remaining centrifugal hydraulic pressure by the balance hydraulic pressure.

Furthermore, since hydraulic pressure control is started at a region where hydraulic pressure is greater than a predetermined spring force of the return spring applied to the dual pistons, hydraulic pressure solenoid valve is not controlled at an unstable low-pressure region and control reliability may be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
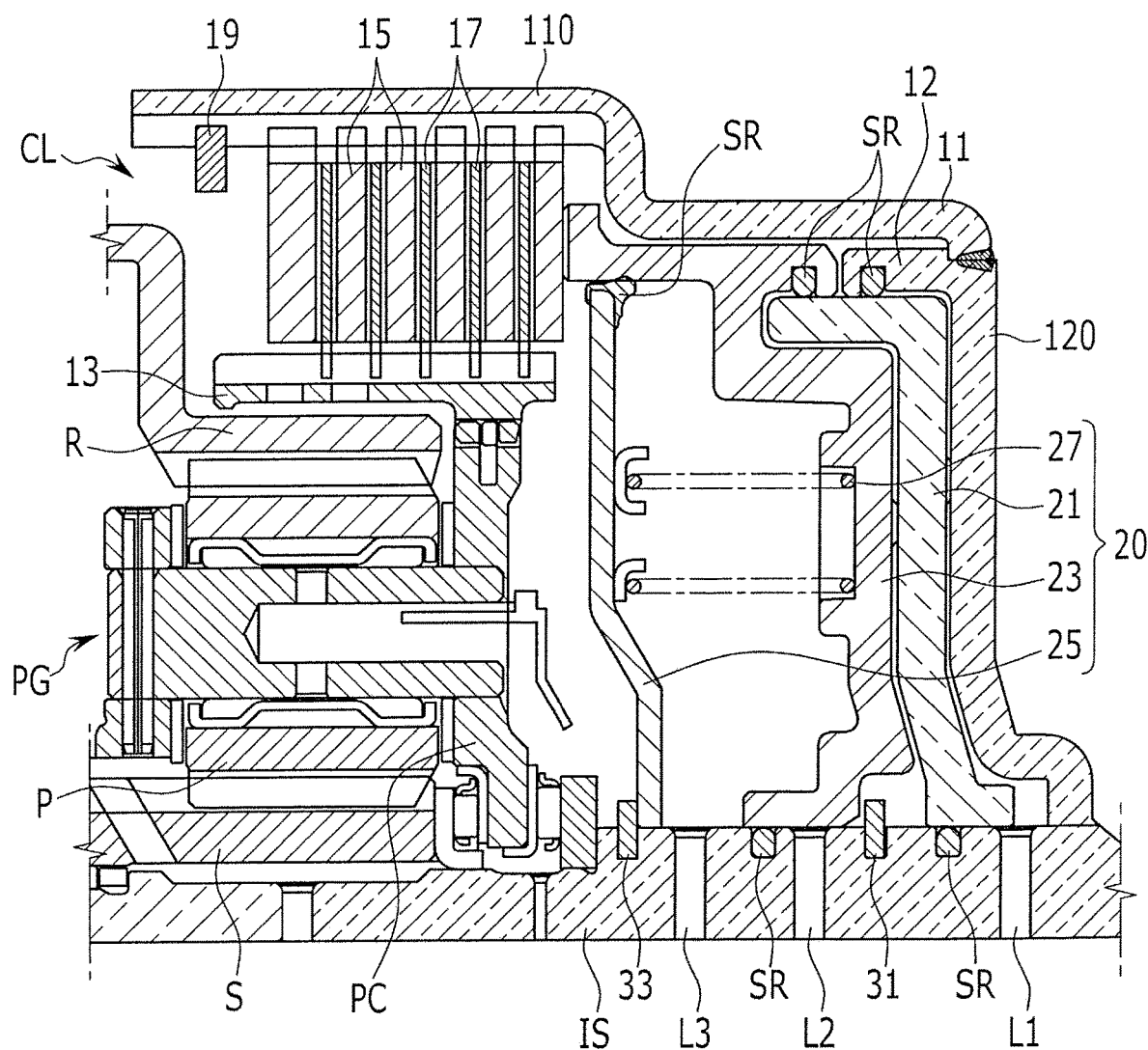
FIG. 1 is a cross-sectional view of a power delivery device configured for an automatic transmission according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a cross-sectional view of a power delivery device configured for an automatic transmission according to an exemplary embodiment of the present invention.

Referring to FIG. 1, a clutch device disposed between one rotation element or input shaft and another rotation element and configured for transmitting power to the another rotation element will be referred to as an example of a power delivery device configured for an automatic transmission according to an exemplary embodiment of the present invention.

That is, a clutch device is configured to transmit torque of an engine or one rotation element to another rotation element. It is exemplified in the exemplary embodiment of the present invention that the clutch device is disposed between an input shaft IS which is one rotation element and a planet carrier PC which is one rotation element of a planetary gear set PG.

For example, the planetary gear set PG is a single pinion planetary gear set and includes a sun gear S, the planet carrier PC and a ring gear R as three rotation elements thereof. That is, the planetary gear set PG includes the sun gear S, the planet carrier PC rotatably supporting a plurality of pinion gears P disposed evenly at an external circumference of the sun gear S and engaged with the sun gear S, and a ring gear R engaged with the plurality of pinion gear P and operably connected to the sun gear S.

The clutch device according to the exemplary embodiment of the present invention includes a clutch CL including friction members between a clutch drum 11 and a clutch hub 13, and a piston device 20 controlling operation of the clutch CL.

That is, the clutch drum 11 is fixedly connected to the input shaft IS operably connected to an output side of the engine, and a plurality of clutch plates 15 is splined to an external circumferential portion 110 of the clutch drum 11. Furthermore, a protruding portion 12 extends in an axial direction at a radial internal side 120 of the external circumferential portion 110 of the clutch drum 11. The protruding portion 12 may be spaced from the external circumferential portion 110 of the clutch drum 11 or may contact with the external circumferential portion 110 of the clutch drum 11.

For the clutch hub 13 to transmit torque of the input shaft IS to the planet carrier PC of the planetary gear set PG when operating the clutch device, an internal circumferential portion of the clutch hub 13 is connected to the planet carrier PC and a plurality of clutch disks 17 is splined to an external circumferential portion of the clutch hub 13.

At the instant time, the plurality of clutch disks 17 is alternatively disposed with the plurality of clutch plates 15, and the plurality of clutch disks 17 and the plurality of clutch plates 15 are supported in an axial direction by a snap ring 19 fitted onto a front end portion of the external circumferential portion 110 of the clutch drum 11.

Furthermore, the piston device 20 includes dual pistons including first and second pistons 21 and 23 of ring plate shape, and a spring retainer 25 and a return spring 27 applying restoring force.

A front end portion of the piston device 20 facing the clutch CL operates the clutch CL by hydraulic pressure to transmit the torque of the input shaft IS to the planet carrier PC.

The first piston 21 is disposed between the input shaft IS and the clutch drum 11 (i.e., the protruding portion 12), and sealing members are located between an internal circumferential portion of the first piston 21 and the input shaft IS and between an external circumferential portion of the first piston 21 and the protruding portion 12 of the clutch drum 11. The first piston 21 is configured to move toward the clutch CL with a predetermined distance by receiving hydraulic pressure through a first hydraulic line L1 formed in the input shaft IS. The first piston 21 together with the second piston 23 pushes the plurality of clutch plates 15 and the plurality of clutch disks 17 to be closely contacted with each other, controlling a gap between the plurality of clutch plates 15 and the plurality of clutch disks 17.

The second piston 23 is disposed between the input shaft IS and the clutch drum 11, and sealing members are located between an internal circumferential portion of the second piston 23 and the input shaft IS and between an external circumferential portion of the second piston 23 and the external circumferential portion of the first piston 21. In further detail, the external circumferential portion of the second piston 23 closely contacts with the external circumferential portion of the first piston 21 at a radial external side of the first piston 21. The second piston 23 directly applies operating force and supplies coupling force to the plurality of clutch plates 15 and the plurality of clutch disks 17 by receiving hydraulic pressure through a second hydraulic line L2 formed in the input shaft IS.

Furthermore, a first stopper 31 is mounted on the input shaft IS between the first piston 21 and the second piston 23. The first stopper 31 is configured to limit displacement of the first piston 21 toward the clutch CL and displacement of the second piston 23 to an opposite direction to the clutch CL.

That is, the first stopper 31 is a snap ring fitted onto the input shaft IS between the first and the second hydraulic lines L1 and L2, and configured to limit the displacement of the first piston 21 toward the clutch CL and the displacement of the second piston 23 to the opposite direction to the clutch CL.

Furthermore, the external circumferential portions of the first piston 21 and the second piston 23 are disposed in parallel with each other in the axial direction thereof, the external circumferential portion of the second piston 23 and the protruding portion 12 of the clutch drum 11 are disposed on the same axis, and the sealing members SR are located between the external circumferential portion of the first piston 21 and the protruding portion 12 of the clutch drum 11 and between the external circumferential portion of the first piston 21 and the external circumferential portion of the second piston 23. Therefore, first and the second pistons 23 and 25 are movable in the axial direction with air-tightness being maintained.

Furthermore, the internal circumferential portions of the first piston 21 and the second piston 23 are disposed in parallel with each other on the input shaft IS, and the sealing members SR are located between the internal circumferential portion of the first piston 21 and the input shaft IS and between the internal circumferential portion of the second piston 23 and the input shaft IS. Therefore, the first piston 21 and the second piston 23 are slidable on the input shaft IS in the axial direction with air-tightness being maintained.

Furthermore, the spring retainer 25 is mounted on the input shaft IS at an opposite direction of the first piston 21 to the second piston 23.

That is, the spring retainer 25 has a disk shape and movement of the spring retainer 25 toward the clutch CL is limited by a second stopper 33 mounted on the input shaft IS. A sealing SR may be located between an external circumferential portion of the spring retainer 25 and the external circumferential portion of the second piston 23.

Balance hydraulic pressure is generated by receiving hydraulic pressure through a third hydraulic line formed in the input shaft IS between the spring retainer 25 and the second piston 23.

For example, the second stopper 33 may be a snap ring fitted onto the input shaft IS.

Furthermore, both end portions of the return spring 27 are supported respectively by the spring retainer 25 and the second piston 23, and the return spring 27 applies restoring force to the first piston 21 and the second piston 23. The return spring 27 may include at least one coil spring.

Figure 2:
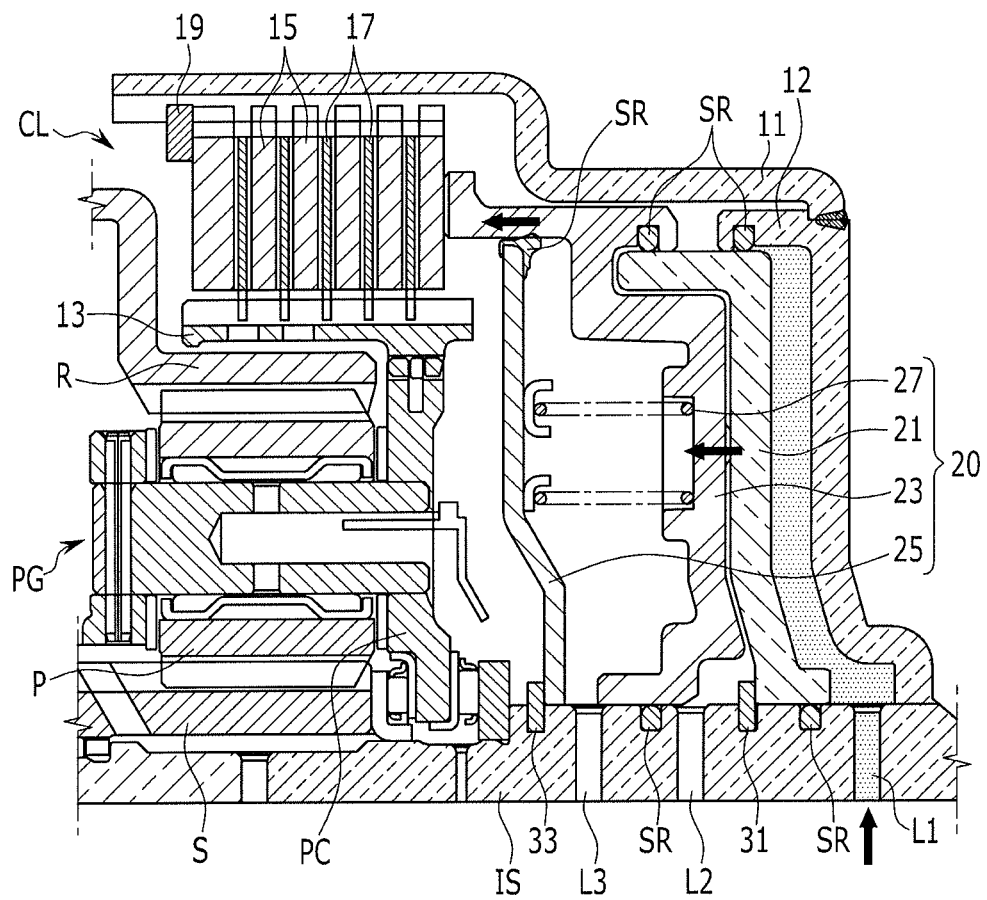
FIG. 2 is a cross-sectional view illustrating operation of a power delivery device configured for an automatic transmission according to an exemplary embodiment of the present invention at first stage.
Figure 3:
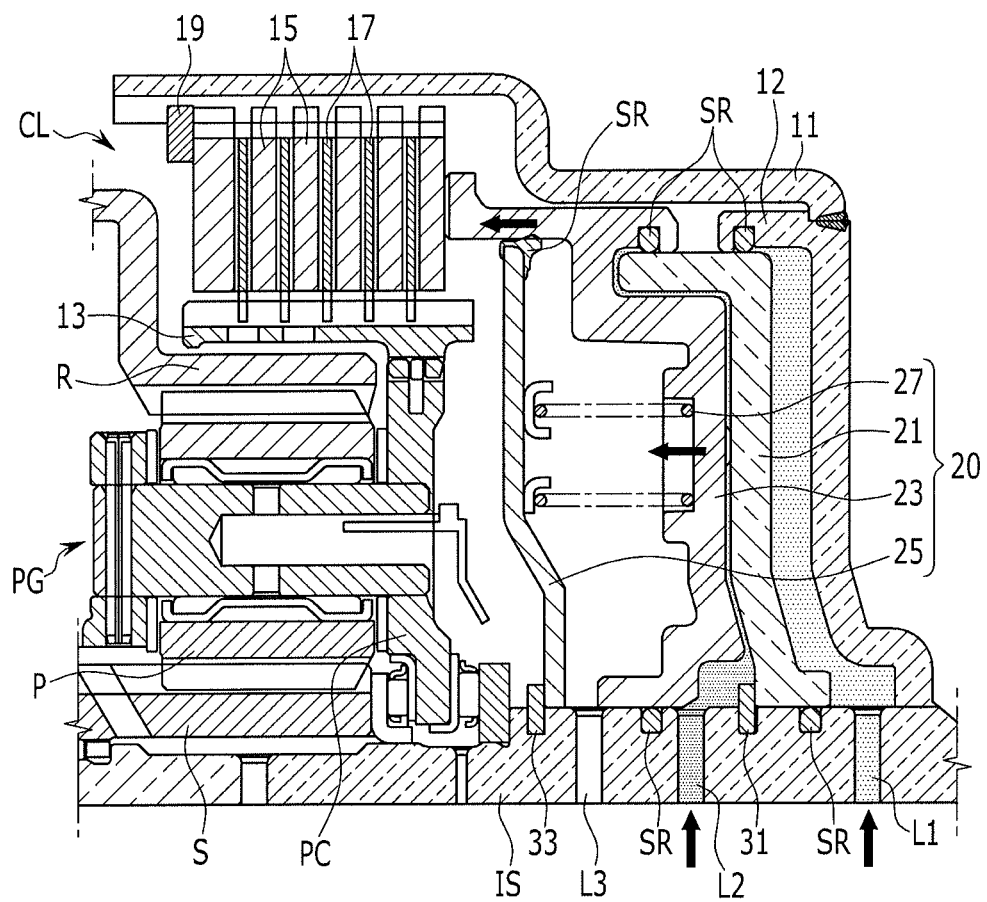
FIG. 3 is a cross-sectional view illustrating operation of a power delivery device configured for an automatic transmission according to an exemplary embodiment of the present invention at second stage.

FIG. 2 is a cross-sectional view illustrating operation of a power delivery device configured for an automatic transmission according to an exemplary embodiment of the present invention at first stage, and FIG. 3 is a cross-sectional view illustrating operation of a power delivery device configured for an automatic transmission according to an exemplary embodiment of the present invention at second stage.

Referring to FIG. 2 and FIG. 3, operation of the power delivery device according to the exemplary embodiment of the present invention will be described.

Referring to FIG. 2, if the hydraulic pressure is supplied between the clutch drum 11 and the first piston 21 through the first hydraulic line L1 to operate the clutch CL, the first piston 21 and the second piston 23 rapidly move toward the clutch CL.

Accordingly, the front end portion of the second piston 23 moves to the clutch plate 15 of the clutch CL with fast speed and closely contacts the plurality of clutch plates 15 with the plurality of clutch disks 17 to control the gap between the clutch plate 15 and the clutch disk 17.

After that, referring to FIG. 3, if the hydraulic pressure is supplied between the first piston 21 and the second piston 23 through the second hydraulic line L2, the second piston 23 moves toward the clutch CL from the first piston 21.

Accordingly, the front end portion of the second piston 23 pushes the clutch plate 15 of the clutch CL to supply coupling force to the plurality of clutch plates 15 and the plurality of clutch disks 17.

The clutch CL transmits the torque of the input shaft IS to the planet carrier PC of the planetary gear set PG with quick responsiveness and sufficient coupling force due to two stage operations of the first piston 21 and the second piston 23.

Meanwhile, referring to FIG. 1, when the clutch according to the exemplary embodiment of the present invention is released, centrifugal hydraulic pressure remaining between the first piston 21 and the second piston 23 and the clutch drum 11 is countervailed by the elastic force of the return spring 27 directly applied to the first and second pistons 21 and 23 and the balance hydraulic pressure supplied through the third hydraulic line L3 between the second piston 23 and the spring retainer 25. Therefore, drag loss between the friction members may be prevented and control reliability may be enhanced.

The power delivery device according to the exemplary embodiment of the present invention utilizes the dual pistons including the first and second pistons 21 and 23 to operate the clutch CL transmitting the torque of the input shaft IS to the rotation element. Therefore, responsiveness may be improved by rapidly controlling the gap between the friction members and power delivery efficiency may be enhanced by securing sufficient coupling force.

Furthermore, since accumulated fatigue repeatedly applied to the clutch plate 15 is minimized by rapidly controlling the gap between the friction members and achieving sufficient coupling force by two stage operation of the first and the second piston 21 and 23, damage of the clutch CL may be minimized.

Since the clutch CL is released by the return spring 27 which is directly applied to the dual pistons including the first piston 21 and the second piston 23 and the balance hydraulic pressure supplied between the second piston 23 and the spring retainer 25, drag loss between the friction members may be prevented and control reliability may be enhanced by countervailing the centrifugal hydraulic pressure remaining between the first piston 21 and the second piston 23 and the clutch drum 11.

Furthermore, since hydraulic pressure control is started at a region where hydraulic pressure is greater than a predetermined spring force of the return spring 27 applied to the second piston 23, hydraulic pressure solenoid valve is not controlled at an unstable low-pressure region and control reliability may be enhanced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present inven-

What is claimed is:

1. A power delivery device for an automatic transmission, the power delivery device comprising:
a clutch drum connected to a first rotation element and including:
an external circumferential portion; and
a protruding portion extending in an axial direction of the power delivery device at a radial internal side of the external circumferential portion;
a clutch mounted in the clutch drum, connected to a second rotation element through a clutch hub, and selectively connectable to the first rotation element; and
a piston device disposed corresponding to the clutch and operating the clutch by hydraulic pressure,
wherein the piston device includes:
a first piston having a first end portion slidably contacting the first rotation element and a second end portion slidably contacting the protruding portion of the clutch drum, and being movable toward the clutch in the axial direction by receiving the hydraulic pressure between the radial internal side of the external circumferential portion of the clutch drum and the first piston through a first hydraulic line formed in the first rotation element;
a second piston having a first end portion slidably contacting the first rotation element and a second end portion slidably contacting the second end portion of the first piston, and having a front end portion directly applying an operating force to the clutch by receiving the hydraulic pressure between the first piston and the second piston through a second hydraulic line formed in the first rotation element;
a spring retainer mounted between the first rotation element and the second piston; and
a return spring mounted between the spring retainer and the second piston and applying restoring force to the first piston and the second piston,
wherein the piston device further includes a first stopper mounted on the first rotation element between the first piston and the second piston and limiting movements of the first piston and the second piston in the axial direction, and
wherein the first stopper is a snap ring fitted onto the first rotation element between the first hydraulic line and the second hydraulic line to limit the movement of the first piston toward the clutch and the movement of the second piston to an opposite direction to the clutch.

2. The power delivery device of claim 1,
wherein a first end portion of the spring retainer is coupled to a second stopper mounted on the first rotation element and movement of the spring retainer toward the clutch is limited by the second stopper, and
wherein the spring retainer supports the return spring in the axial direction, has a second end portion slidably contacting the second end portion of the second piston, and generates balance hydraulic pressure between the spring retainer and the second piston by receiving hydraulic pressure between the spring retainer and the second piston through a third hydraulic line formed in the first rotation element.

3. The power delivery device of claim 2, wherein the second stopper is a snap ring fitted onto the first rotation element.

4. The power delivery device of claim 1,
wherein sealing members are located between the second end portion of the first piston and the protruding portion of the clutch drum and between the second end portion of the first piston and the second end portion of the second piston.

5. The power delivery device of claim 1,
wherein the first end portions of the first piston and the second piston are disposed in parallel with each other and slidable on the first rotation element, and
wherein sealing members are located between the first end portion of the first piston and the first rotation element and between the first end portion of the second piston and the first rotation element.

6. The power delivery device of claim 1,
wherein the first rotation element is an input shaft operably connected to an output side of an engine, and
wherein the second rotation element is one among a sun gear, a planet carrier and a ring gear of a planetary gear set.

7. A power delivery device for an automatic transmission, the power delivery device comprising:
a clutch drum connected to a first rotation element and including:
an external circumferential portion; and
a protruding portion extending in an axial direction of the power delivery device at a radial internal side of the external circumferential portion;
a clutch mounted in the clutch drum, connected to a second rotation element through a clutch hub, and selectively connectable to the first rotation element; and
a piston device disposed corresponding to the clutch and operating the clutch by hydraulic pressure,
wherein the piston device includes:
a first piston having a first end portion slidably contacting the first rotation element and a second end portion slidably contacting the protruding portion of the clutch drum, and being movable toward the clutch in the axial direction by the receiving the hydraulic pressure between the radial internal side of the external circumferential portion of the clutch drum and the first piston through a first hydraulic line formed in the first rotation element;
a second piston having a first end portion slidably contacting the first rotation element and a second end portion slidable contacting the second end portion of the first piston, and having a front end portion directly applying an operating force to the clutch by receiving the hydraulic pressure between the first piston and the second piston through a second hydraulic line formed in the first rotation element;
a spring retainer mounted between the first rotation element and the second piston; end
a return spring mounted between the spring retainer and the second piston and applying restoring force to the first piston and the second piston,
wherein sealing members are located between the second end portion of the first piston and the protruding portion of the clutch drum and between the second end portion of the first piston and the second end portion of the second piston, and
wherein the second and portion of the second piston selectively contacts with the second end portion of the first piston at a radial external side of the first piston.

8. The power delivery device of claim 7, wherein the second end portion of the second piston and the protruding portion of the clutch drum are disposed on a same axis.

9. A power delivery device for an automatic transmission, the power delivery device comprising:
a clutch drum connected to an input shaft and including:
an external circumferential portion; and
a protruding portion extending in an axial direction of the power delivery device at a radial internal side of the external circumferential portion;
a clutch mounted in the clutch drum and including a friction member connected to a planet carrier of a planetary gear set through a clutch hub; and
a piston device disposed corresponding to the clutch and operating the clutch by hydraulic pressure,
wherein the piston device includes:
a first piston having a first end portion slidably contacting the input shaft and a second end portion slidably contacting the protruding portion of the clutch drum, and being movable toward the clutch in the axial direction by receiving hydraulic pressure between the first piston and the radial internal side of the external circumferential portion of the clutch drum through a first hydraulic line formed in the input shaft;
a second piston having a first end portion slidably contacting the input shaft and a second end portion slidably contacting the second end portion of the first piston, and having a front end portion directly applying operating force to the clutch by receiving hydraulic pressure between the first piston and the second piston through a second hydraulic line formed in the input shaft;
a first stopper mounted on the input shaft between the first piston and the second piston and limiting movements of the first piston and the second piston in the axial direction;
a spring retainer mounted between the input shaft and the second piston, wherein a first end portion of the spring retainer is coupled to a second stopper mounted on the input shaft and movement of the spring element toward the clutch is limited by the second stopper; and
a return spring mounted between the spring retainer and the second piston and applying restoring force to the first piston and the second piston,
wherein the first stopper is a snap ring fitted onto the input shaft between the first hydraulic line and the second hydraulic line to limit a movement of the first piston toward the clutch and a movement of the second piston to an opposite direction to the clutch.

10. The power delivery device of claim 9, wherein the spring retainer has a second end portion slidably contacting the second end portion of the second piston and is configured to generate balance hydraulic pressure between the spring retainer and the second piston by receiving hydraulic pressure between the spring retainer and the second piston through a third hydraulic line formed in the input shaft.

11. The power delivery device of claim 9, wherein the second stopper is a snap ring fitted onto the input shaft.

12. The power delivery device of claim 9, wherein sealing members are located between the second end portion of the first piston and the protruding portion of the clutch drum and between the second end portion of the first piston and the second end portion of the second piston.

13. The power delivery device of claim 12, wherein the second end portion of the second piston selectively contacts with the second end portion of the first piston at a radial external side of the first piston.

14. The power delivery device of claim 13, wherein the second end portion of the second piston and the protruding portion of the clutch drum are disposed on a same axis.

15. The power delivery device of claim 9, wherein the first end portions of the first piston and the second piston are disposed in parallel with each other and slidable on the input shaft, and
wherein sealing members are located between the first end portion of the first piston and the input shaft and between the first end portion of the second piston and the input shaft.

* * * * *